(12) United States Patent
Clement

(10) Patent No.: US 7,209,021 B2
(45) Date of Patent: Apr. 24, 2007

(54) MAGNETIC SECUREMENT DEVICE MAGNETICALLY ATTACHED TO A SHEETROCK FASTENER

(76) Inventor: Joe Raymond Clement, 16218 Woodland La., Minnetonka, MN (US) 55345

( * ) Notice: Subject to any disclaimer, the term of this patent is extended or adjusted under 35 U.S.C. 154(b) by 101 days.

(21) Appl. No.: 11/311,855

(22) Filed: Dec. 19, 2005

(65) Prior Publication Data
US 2006/0152317 A1    Jul. 13, 2006

Related U.S. Application Data

(63) Continuation-in-part of application No. 11/032,161, filed on Jan. 7, 2005, now abandoned.

(51) Int. Cl.
H01F 7/20 (2006.01)
(52) U.S. Cl. ...................... 335/285; 335/302
(58) Field of Classification Search ........ 335/285–306; 324/67
See application file for complete search history.

(56) References Cited

U.S. PATENT DOCUMENTS

D374,595 S * 10/1996 Welder .................. D8/14
6,229,294 B1 * 5/2001 Wun ...................... 324/67
6,456,053 B1 * 9/2002 Rowley ................. 324/67
6,696,827 B2 * 2/2004 Fazekas et al. ........ 324/67
6,747,536 B1 * 6/2004 Miller, Jr. .............. 335/285

OTHER PUBLICATIONS

Retail Product: "Stud Magnet" manufactured by Master Magnetics, Inc. & on the web at www.magnetsource.com/Consumer%20Pages/StudMag.html, no date.

www.gaussboys.com (index)\Uses and Ideas\Redecorate Your Home This is and internet site. No date information is available.

* cited by examiner

Primary Examiner—Ramon M. Barrera

(57) ABSTRACT

A magnetic securement device that includes a high energy magnet and a securing member. The magnet attaches to sheetrock walls through magnetic attraction to sheetrock screws or nails. The device would support display objects by either squeezing them between the device and the wall or by hanging them on hooks or frames affixed to the magnet. The magnet of the device is a lightweight rare earth magnet that provides great strength in a small package. The magnets are able to attach themselves to the head of a screw or nail and cling there with enough force to support light display objects attached thereto.

20 Claims, 3 Drawing Sheets

Vertical Cross Section of Second Embodiment

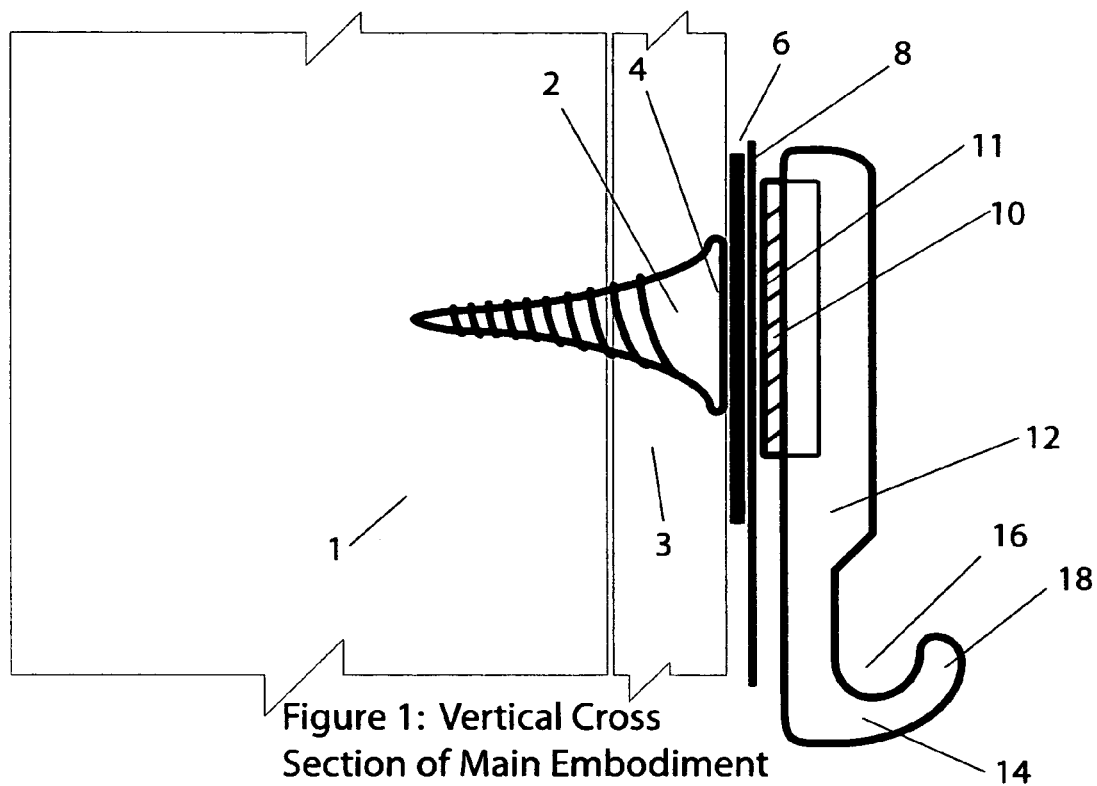
Figure 1: Vertical Cross Section of Main Embodiment
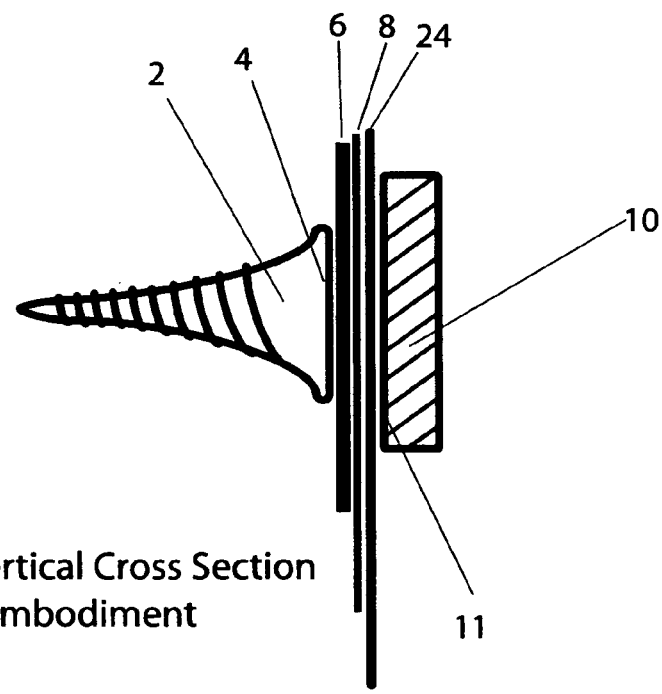
Figure 2: Vertical Cross Section of Second Embodiment

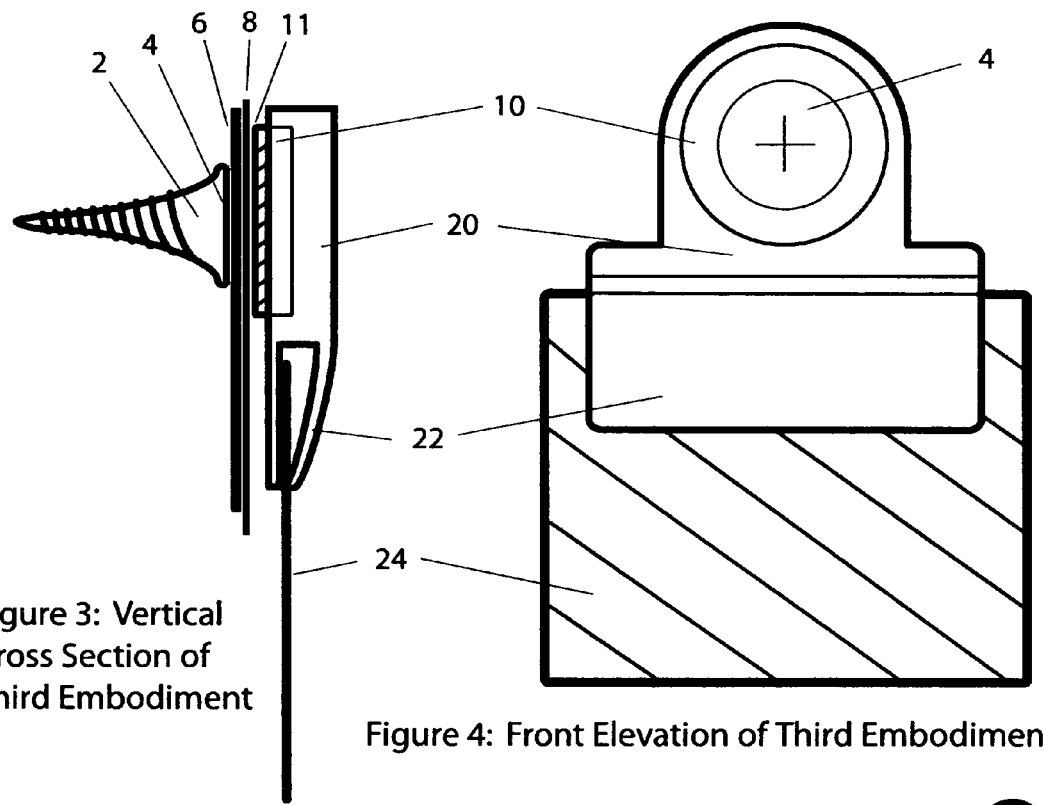
Figure 3: Vertical Cross Section of Third Embodiment
Figure 4: Front Elevation of Third Embodiment
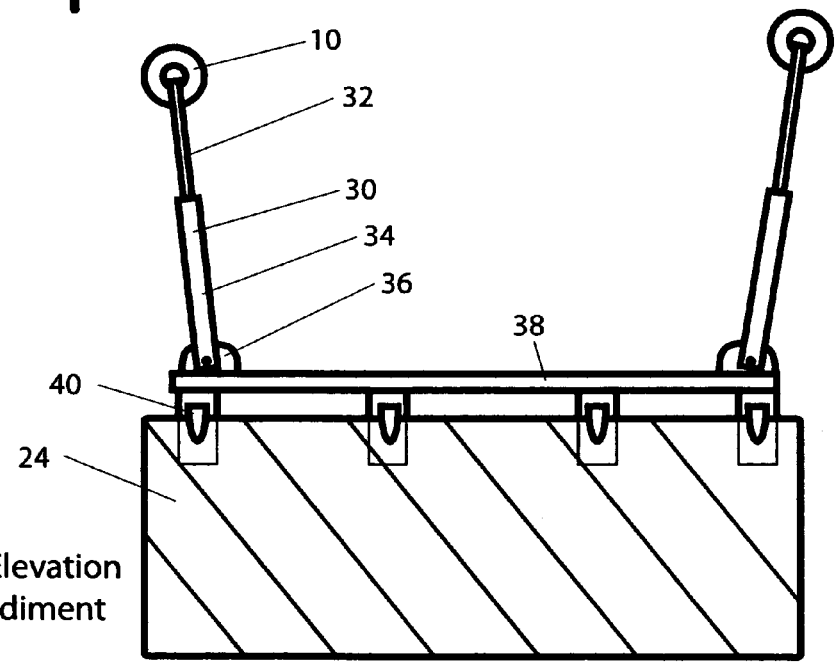
Figure 5: Front Elevation of Fourth Embodiment

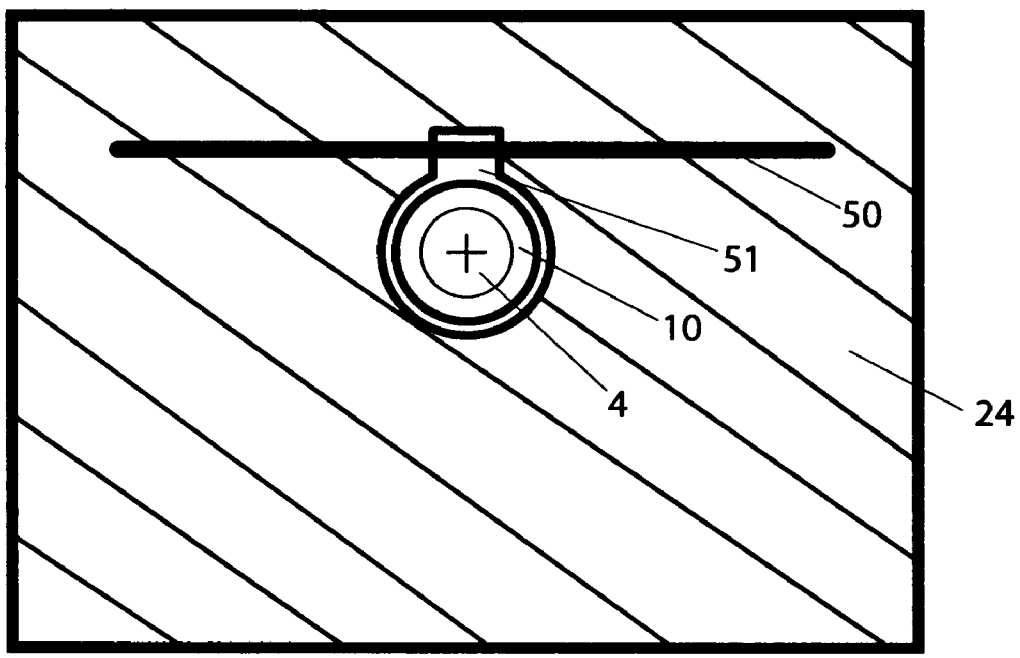
Figure 6: Front Elevation of Fifth Embodiment
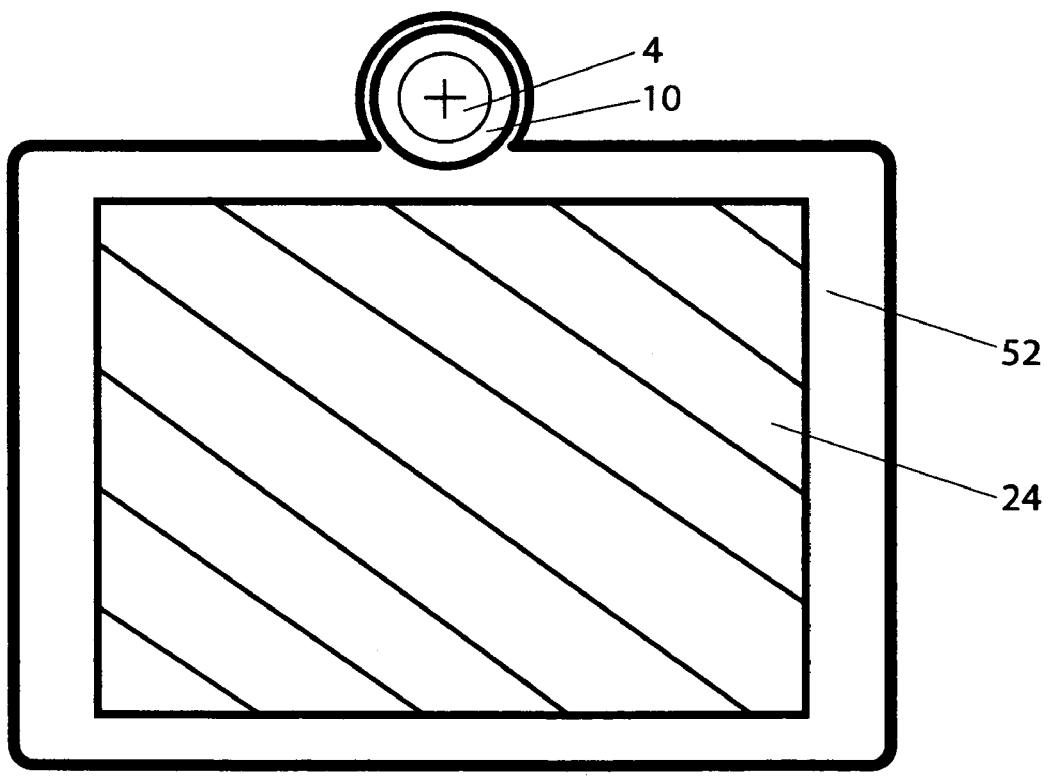
Figure 7: Front Elevation of Sixth Embodiment

MAGNETIC SECUREMENT DEVICE MAGNETICALLY ATTACHED TO A SHEETROCK FASTENER

This is a continuation-in-part of application Ser. No. 11/032,161 filed on Jan. 7, 2005 now abandoned, the entire contents of which are hereby incorporated by reference.

BACKGROUND

1. Field of Invention

This invention describes a magnetic securement device magnetically attached to an in-situ sheetrock fastener. Once in place, the magnetic securement device can support objects desired to be displayed on a wall.

2. Description of Prior Art

There are many magnetic clips and photo frames on the market today. Typically they consist of a low strength magnet affixed to a clip or frame. The clip is usually made of steel or plastic. Photo frames can be made of plastic or foam. Very few examples of high power rare earth magnetic clips or frames exist. The common low strength magnetic clips and frames are designed to hang on a heavy ferric surface such as a steel file cabinet or refrigerator. However, most interior walls of buildings are sheathed with sheetrock. This is the most common wall surface available for hanging interior display objects. The only available in situ ferric objects near the surface of these walls are corner reinforcers and sheetrock fasteners.

The most common of these two in situ ferric objects are steel sheetrock fasteners. These exist in nearly all sheetrock walls just beneath the surface. These fasteners are driven through a panel of sheetrock into a wall stud and there secured. The driven head of these fasteners is generally flat and quite small, a half inch or less in diameter. The fasteners are either steel screws or steel nails. They are usually covered by a thin layer of sheetrock compound and then overlaid with paint, stucco, or wall covering. They, therefore, cannot be seen. Due to the fact that these fasteners are small, covered, and not visible, no magnetic clip has been designed utilize to them. No securement device known today is able to attach to these small heads and cling there with enough strength to support a display object.

A common tool used to locate sheetrock fasteners is the magnetic stud finder. This device uses a magnet to locate undersurface steel objects and visually indicate their presence. These devices have no ability to attach themselves to the fasteners.

One web site does mention the possibility of a rare earth, neodymium magnet attaching itself to a sheetrock fastener. The index page to this website is www.gaussboys.com. Under their "Super Magnet Applications" is a subsection titled "Redecorate your home". In it the web site states, "Try using a couple of neodymium super magnets as stud finders when you are hanging pictures on a wall. The magnets will stick to the sheet rock nails on the studs and give you a great visual of what you have to work with while you make all of your pictures look balanced on the wall." This procedure realizes what others have done before with magnets, namely to merely locate nails in the wall. This text indicates no understanding of using the magnets to secure an independent display object to the nail and there support it. The magnets simply provide visual information for the locating of studs. This use of magnets simply follows the known art of locating sheetrock fasteners through magnetic detection. The authors here mention only the possibility of the magnets supporting themselves.

Having a magnet support an independent object for display is entirely different than simply supporting itself. This ramification is not mentioned or foreseen by this web site. This section of the site does not mention any combination of a neodymium magnet and a clip or display object.

Further evidence exists that the gaussboys site does not anticipate hanging independent objects on the magnets attached to the sheetrock fasteners. The gaussboys site is an e-commerce site organized to sell magnets and related goods. If the authors of this site had understood the possibility of hanging objects with the magnets, they certainly would have explicitly described such an assembly. Such an application could greatly boost the commercial sales of the site if that use was exploited.

No other combination of neodymium magnets attached to sheetrock fasteners is known in the public domain.

SUMMARY

The device described herein combines an in situ sheetrock fastener with a neodymium magnet magnetically attached to the fastener. The magnet can then secure an independent object by squeezing the object between the magnet and the wall, by hanging it directly on the magnet, or by attaching the object to a securing member that is in turn affixed to the magnet. The securing member could be a simple hook or a larger element such as an elongated clip or frame.

OBJECTS AND ADVANTAGES

Accordingly, several objects and advantages of the disclosed design follow.

The placement of the magnetic securement device is very straightforward. The sheetrock fastener is located by sliding the magnet across the surface of the wall in descending arcs. This waving action reveals the location of the sheetrock fasteners as they attract the magnet as it passes near them. Once the fastener is found, the device is simply attached at that location. With experience this procedure usually takes only a part of a minute to successfully conclude.

Placing the magnetic device is thus very simple. No tools, adhesives, drills, or wires are needed. Once the sheetrock fastener is located, the magnet of the device is simply centered on the sheetrock fastener and released. Removal is even simpler and faster. Simply lift the magnet from the sheetrock fastener. Since no holes were made for the application, no wall patching need accompany the removal of the device. No sticky residue is left on the wall as is common with tape and adhesive gums. This system is ideal for temporary holiday ornament hanging as the easy on and off procedure suits that application well.

The magnetic device is very simple and inexpensive to manufacture. The retail price will thus be low enough for use in multiple applications. The device is made of simple and commonplace materials. A combination of a neodymium or other rare earth magnet and a plastic securing member comprises most of the embodiments of the device. The device is also lightweight and compact which will aid with shipping and display costs.

One of the permutations of the device is the combination of a sheetrock fastener with a plain neodymium magnet attached to it. Between these two items a sheet element is secured by squeezing. When this combination is used, an unusual and unforeseen result occurs. If it is desired to move the graphic sheet, the magnet need not be removed, the sheet repositioned, and the magnet replaced. Rather the sheet can be grasped and slowly pulled to its new location. The magnet slides across the face of the sheet so that the magnet retains its original position centered on the fastener. This same result occurs when multiple magnets hold a sheet to a wall. This is of great benefit as a location originally chosen for a graphic sheet is rarely the final position. Rather the final location of such sheets is often found by trial and error. This ability of the device to allow a repositioning of the sheet without removing the device is unknown in other sheetrock attachment applications.

The magnetic device can support up to nearly a pound of weight in some applications. This gives it the ability to secure calendars, posters, pictures, many types of ornaments, and a host of other display objects. The shape of the display object is preferentially planar so that the object will lie flat against the wall. This configuration is best suited for the device as objects lying against the wall exert only a vertical, downward force on the magnet. The magnet is most able to withstand a force from this direction.

Still further objects and advantages of the disclosed device will become apparent from consideration of the following figures and descriptions.

DRAWING DESCRIPTIONS

FIG. 1: Vertical Cross Section of Main Embodiment
FIG. 2: Vertical Cross Section of Second Embodiment
FIG. 3: Vertical Cross Section of Third Embodiment
FIG. 4: Front Elevation of Third Embodiment
FIG. 5: Front Elevation of Fourth Embodiment
FIG. 6: Front Elevation of Fifth Embodiment
FIG. 7: Front Elevation of Sixth Embodiment

DESCRIPTIONS: FIGS. 1 TO 7

FIG. 1 illustrates a vertical cross section of the main embodiment. A sheetrock screw 2 has a flat head 4 and lies imbedded in a piece of sheetrock 3 and a wall stud 1. A thin layer of hardened sheetrock compound 6 and paint 8 cover the flat head 4. A magnetic securement device 12 lies close to the flat head 4. The magnetic securement device 12 includes a magnet 10 with a flat base 11. The magnetic securement device 12 also includes a securing member that is an attached hook 18 with a recurve 14 that defines a void 16.

FIG. 2 illustrates a vertical cross section of the second embodiment. Graphic sheet element lies between magnet 10 and sheetrock screw 2.

FIG. 3 illustrates a vertical cross section of the third embodiment. The magnetic securement device 20 includes a clip 22 that grips a graphic sheet element 24.

FIG. 4 illustrates a front elevation of the third embodiment with the same components as noted in FIG. 3.

FIG. 5 illustrates a front elevation of the fourth embodiment. Arms 30 include inner rods 32 and outer rods 34 that are attached to connecting bar 38 at joints 36. A graphic sheet element 24 lays within multiple clips 40 that are spaced along connecting bar 38.

FIG. 6 illustrates a front elevation of the fifth embodiment. A horizontal extending arm 50 and magnet 10 lies on the front surface of a graphic sheet element 24. A plastic attachment device 51 joins the magnet 10 to the extending arm 50.

FIG. 7 illustrates a front elevation of the sixth embodiment. A magnet 10 is set in a frame 52 encasing graphic sheet element 24.

OPERATION

FIG. 1. The magnetic securement device 12 is attached to the sheetrock screw 2 by manually placing the flat base 11 of the magnet 10 close enough to the flat head 4 for magnetic attraction to secure it. This is done by sliding the magnetic securement device across the wall in sweeping arcs that slowly move up and down the wall until the tug of the sheetrock screw 2 is sensed. The magnetic attraction is then able to secure the magnetic securement device 12 there.

The magnet required to accomplish this attachment must be a very high energy magnet and fit within certain size parameters. The only magnet currently appropriate to this function is a rare earth magnet, preferably one with a Bh max over 35. Neodymium magnets are the best of the rare earth magnets due to their superior strength and low cost. A neodymium magnet is able to support not only itself on the sheetrock screw 2 but is also able to support a display object. No other magnet type is able to match the performance of the neodymium magnet. These magnets are coated with metal or epoxy to keep the magnetic material from oxidizing. The most common metal coating is nickel plating.

To optimize its supporting ability, the size of the magnet 10 should be a little larger in diameter than the flat head 4. Any extra oversizing is largely wasted as the strength of the magnetic attraction is inversely proportional to the cube of the distance between the magnet 10 and the screw 2. The optimal width of the magnet 10 is approximately three fourths of an inch. The optimal thickness of the magnet is approximately one half of an inch due to the same factors. As extra thickness is added, the additional portion of the magnet 10 is located farther from the flat head 4 and thus not as effective. The optimal shapes are those that concentrate the mass of the magnet 10 near the flat head 4. These shapes include disc, hemisphere, or cube.

The thickness of the sheetrock compound 6 and the paint 8 have a pronounced impact on the ability of the magnet 10 to adhere. Most sheetrock fasteners lie between two and ten hundredths of an inch beneath the wall surface. This distance is small enough to allow the magnet 10 to cling firmly to the wall.

After the magnetic securement device 12 is attached to the fastener, a display object can be hung in the void 16 defined by the recurve 14 of the hook 18. The display object will then lie in a vertical position below the magnet 10. The force exerted on the magnetic securement device 12 is thus a downward force that the magnetic attachment is most able to withstand.

FIG. 2. A magnet 10 attached to sheetrock screw 2 can secure a graphic sheet element 24. The magnetic attraction between the magnet 10 and the sheetrock screw 2 squeezes the graphic sheet element 24 and prevents it from slipping down. Multiple magnets 10 can be used in this same manner to support larger graphic sheets elements 24.

FIGS. 3 & 4. Magnetic securement device 20 includes a horizontally extended clip 22 that retains the graphic sheet element 24 by squeezing it over an extended length.

FIG. 5. Magnets 10 are shown attached to sheetrock fasteners located at different heights. The arm 30 is adjustable in length. An inner rod 32 can slide into outer rod 34 to accomplish this. Thus the connecting bar 38 can be kept level and the clips 40 attached thereto can support a graphic sheet element 24 in a horizontal position.

FIG. 6. Magnet 10 and extending arm 50 press against the graphic sheet element 24 and thus support it on the wall at multiple locations.

FIG. 7. Magnet 10 supports frame 52. The frame 52 supports a graphic sheet element 24 by holding the edges firmly in place. The frame 52 could have a transparent or open front so that the graphic sheet element 24 may be viewed. The frame 52 could secure the graphic sheet element 24 by squeezing it, by holding it in a confining enclosure, by using adhesives, or other.

CONCLUSION, RAMIFICATIONS AND SCOPE OF INVENTION

From the above descriptions, it is evident that the invention detailed herein improves upon the current art of displaying objects on sheetrock walls. The ease and simplicity of magnetic securement has not been previously exploited.

Many minor variations to the above noted invention are possible. The flat base of the magnet could have a textured surface or minute teeth that would help the base grip the wall. A tac coating could be applied to the base of the magnet to increase the ability of the device to hold firm. The tac could be of the type that leaves no residue behind.

The magnet could be partially encased in a light steel jacket that could improve the holding ability of the magnet. This is possible as magnetic flux lines concentrate in steel.

The sheetrock fastener could be magnetized. This would increase the magnetic attraction of the magnetic securement device.

A single hanging arm could have one end attached to the magnet and the other end attached to the securing member. The hanging arm could have a means for adjusting its length so that an object held in the securing member could hang at variable distances from the fastener.

The magnet itself or its plating could include a hook shape so display objects could be directly attached to them without the need for affixing a separate securing member.

A securing member that is a frame could take on many shapes. The frame could have a clear or open front. The frame could have slots for the edge of the graphic sheet element to slide into or clips to hold it. The frame could me made of plastic, paper, foam, or other light material.

These and many other permutations are possible. Therefore the scope of this invention should not be construed to be limited to the few example described herein, but by the appended claims and their legal equivalents.

I claim:

1. A magnetic securement device comprising:
a) a permanent magnet including a base;
b) an in situ sheetrock fastener including a ferric head;
c) said base of said permanent magnet positioned adjacent to said ferric head;
d) said permanent magnet magnetically attached to said ferric head;
e) a securing member configured and arranged to support a structurally independent object; and
f) said permanent magnet and said securing member together comprising said magnetic securement device, whereby the structurally independent object is secured for display or support on a wall.

2. The device of claim 1 wherein:
a) said permanent magnet including at least one other surface; and
b) said securing member attached to said other surface.

3. The device of claim 2 wherein:
a) said securing member is selected from the group consisting of a clip, a hook, a frame, a confining enclosure, an adhesive pad, and part of a hook and loop system.

4. The device of claim 2:
a) including two of the permanent magnets;
b) including two of the fasteners;
c) including two arms;
d) including a connecting bar;
e) said permanent magnets attached to different said fasteners;
f) each of said two arms including a basal end, a middle section, and a projecting end;
g) the basal ends attached to the other surfaces of different said permanent magnets;
h) each said projecting end terminating a predetermined distance away from and predominantly down from said permanent magnets that said arms are attached to;
i) each said middle section constructed and arranged to provide variability of length;
j) said connecting bar attached to the projecting ends of said two arms; and
k) said connecting bar including said securing member, whereby the permanent magnets may be attached to fasteners at differing heights allowing said connecting bar to be held horizontally through adjustment of the arms so that a structurally independent object may be hung level.

5. The device of claim 2 comprising:
a) a hanging arm;
b) said hanging arm positioned between said other surface and said securing member;
c) said hanging arm attached to said other surface and said securing member; and
d) said hanging arm constructed and arranged to provide variability of length,
whereby a structurally independent object may be hung at variable distances below the fastener.

6. The device of claim 3 wherein:
a) said securing member has a width that extends horizontally; and
b) said securing member constructed and arranged to provide securement at multiple locations,
whereby a structurally independent object may be secured at multiple locations along the horizontal extension of the securing member.

7. The device of claim 3 wherein:
a) said clip, said hook, said frame, and said confining enclosure form a partially enclosed void; and
b) the void substantially lies directly beneath said permanent magnet,
whereby a structurally independent object may be hung in the void in a location substantially directly beneath the permanent magnet.

8. The device of claim 1 wherein:
a) said permanent magnet is a rare earth magnet.

9. The device in claim 1 wherein:
a) said base including minute projections,
whereby the permanent magnet has increased resistance to vertical sliding.

10. The device in claim 1 wherein:
a) said base including a tac coat,
whereby the permanent magnet has increased resistance to vertical sliding.

11. The device in claim 1 wherein:
a) the fastener is selected from the group consisting of a screw and a nail;
b) said ferric head utilized for securing a panel of sheetrock;
c) said ferric head is covered with sheetrock compound; and d) said sheetrock compound is overlain with a covering selected from the group consisting of paint, wallpaper, or stucco.

12. The device of claim 1 wherein:
a) said permanent magnet including at least one other surface; and
b) said other surface of a predetermined shape to support a structurally independent object.

13. The device of claim 1 wherein:
a) said permanent magnet including at least one other surface;
b) said permanent magnet including two magnetic poles;
c) one of the said two magnetic poles located on said base;
d) the other of the said two magnetic poles located on said other surface; and
e) said other surface is said securing member,
   whereby a structurally independent object including ferric material may be magnetically attached to the securing member.

14. The device of claim 1 wherein:
a) said permanent magnet is of a predetermined size, shape, and strength to squeeze and support a flat element between a wall surface covering said sheetrock fastener and said base,
   whereby a graphic sheet element or a flat tab supporting a display object is squeezed between the magnet and the fastener and thereby supported.

15. The device of claim 14 comprising:
a) a plurality of the permanent magnets;
b) a plurality of the fasteners; and
c) each of said permanent magnets magnetically attached to different said fasteners,
   whereby a larger graphic sheet element may be squeezed between the magnets and the fasteners and thereby supported at several locations.

16. The device of claim 2 wherein:
a) said securing member comprising a frame for supporting sheet elements,
   whereby photos and pictures may be supported on sheetrock walls.

17. The device of claim 2 wherein:
a) said securing member including a visually clear central portion and a peripheral frame; and
b) said peripheral frame configured and arranged to support sheet elements,
   whereby a graphic sheet element may be placed in the frame, viewed in the central portion, and secured on a wall.

18. The device of claim 2 comprising:
a) an extending arm;
b) said extending arm is said securing member;
c) said extending arm including a segment lying against a wall surface; and
d) said segment of said extending arm positioned a predetermined distance away from said permanent magnet,
   whereby a graphic sheet element may be further supported when squeezed between the segment of the extending arm and the wall.

19. A magnetic securement device comprising:
a) a permanent magnet including a base;
b) an applied wall sheathing to wall stud fastener;
c) the fastener made of steel and including a head;
d) said head covered with an opaque material;
e) said base of said permanent magnet positioned adjacent to said head of said fastener;
f) said permanent magnet magnetically attached to said fastener; and
g) said permanent magnet including a securing member configured and arranged to support a structurally independent object through mechanisms selected from the group consisting of squeezing the object between said opaque material and said permanent magnet, hanging the object directly on said permanent magnet, and attaching the object to a securing member that is in turn attached to said permanent magnet.

20. A magnetic display device comprising:
a) a permanent magnet including a base;
b) a steel, in situ, sheetrock fastener;
c) a display element;
d) said base of said permanent magnet positioned adjacent to the fastener;
e) said permanent magnet magnetically attached to said fastener;
f) said permanent magnet attached to said display element; and
g) said permanent magnet and said display element together comprising said magnetic display device,
   whereby a display object may have a magnet attached to it and then be displayed on a wall.

\* \* \* \* \*